United States Patent Office 2,922,766
Patented Jan. 26, 1960

2,922,766

PROCESS OF REGENERATING PLATINUM ALUMINA CATALYSTS

Marvin F. L. Johnson, Homewood, Ill., Carl D. Keith, Munster, Ind., and Warren E. Stewart, Park Forest, Ill., assignors to Sinclair Refining Company, New York, N.Y., a corporation of Maine No Drawing. Application May 31, 1955
Serial No. 512,334

3 Claims. (Cl. 252—419)

This invention relates to a method for regenerating a platinum-alumina catalyst which has been deactivated or carbonized through formation of coke on the catalyst particles as during the reforming of petroleum hydrocarbons. More specifically, this invention is concerned with a process for regenerating a fluoride-free platinum-alumina catalyst prepared according to the process of United States patent applications, Serial No. 288,058, filed May 15, 1952, now abandoned, and Serial No. 489,726, filed February 21, 1955, and now U.S. Patent No. 2,838,444, which catalyst has been carbonized as in a reforming operation.

The catalytic reforming of hydrocarbon stocks involves processing the stock under conditions of elevated temperature and pressure, usually in the presence of a substantial partial pressure of hydrogen, and is based upon one or more reactions representing chemical conversion of the hydrocarbon constituents of the charge stock. The more valuable reforming operations are characterized by the utilization of catalysts which promote selectively such hydrocarbon reactions as isomerization of normal paraffins to isoparaffins, dehydrocyclization of normal paraffins to naphthenes and aromatics, dehydrogenation of naphthenes to aromatics, isomerization of 5-membered naphthenic ring compounds to 6-membered naphthenic ring compounds which then may be dehydrogenated to aromatics, and hydrocracking of relatively long chain paraffins to shorter chain paraffins. The selection of a catalyst is highly critical and is rendered exceedingly difficult since the equilibria and conditions favoring certain reactions are often unfavorable for other reactions. For example, isomerization is favored in initial rate by high temperature but with respect to equilibrium by low temperature, while dehydrogenation is favored by high temperature. The presence of hydrogen favors hydrocracking and tends to suppress dehydrogenation under reforming conditions. The presence of hydrogen, however, is necessary to reduce the formation of coke which tends to deactivate the catalyst by fouling the catalyst surface, by hydrogenating unsaturates that would go to coke and by hydrocracking tarry coke precursors in an early stage of their formation by condensation. Although hydrocracking improves octane number, it tends to reduce yield by producing non-condensible hydrocarbon gases, and it contributes towards coke formation by producing hydrocarbon fragments which may coke. Hydrocracking is particularly undesirable in reforming selected hydrocarbon stocks such as $C_6$ fraction or a $C_7$ fraction to produce respectively benzene or toluene.

An even more difficult problem in the commercial application of catalytic reforming in petroleum refining is the development of catalysts having sufficient life or aging stability to provide a reasonably low unit catalyst cost per barrel of charge stock processed. This requires a low rate of activity decline during processing with platinum-type catalysts since these catalysts in general are not susceptible of regeneration or reactivation by the means normally practiced by a petroleum refiner and yet are intrinsically expensive in terms of materials and methods of manufacture.

Based upon preparation, examination and evaluation under reforming conditions of a great number of different catalysts of the platinum-alumina type (numbering many hundreds) it has been found that these catalysts are highly sensitive to variations in preparation and to variations in the conditions of the reforming operation including the feed stock to be processed. It has been discovered that alumina-platinum or platinum-type metal catalysts having unexpected advantages from the standpoint of activity, selectivity and aging result when the hydrogel, or mixture of precursor alumina phases, which is converted to the ultimate alumina base, predominates in crystalline alumina trihydrate. The crystalline trihydrate phase contains one or more forms corresponding to the well-known hydrate forms (see Weiser, Inorganic Colloid Chemistry, 1935, vol. II, pp. 90 and 92), gibbsite ($\gamma$-$Al_2O_3 \cdot 3H_2O$), bayerite ($\alpha$-$Al_2O_3 \cdot 3H_2O$) and a third trihydrate form which has been designated as randomite. Moreover, the presence in the precursor mixture of a minor amount of a hydrate either in the form of amorphous gelatinous hydrated alumina or in a form corresponding after drying to the monohydrate, e.g., boehmite ($\gamma$-$Al_2O_3 \cdot H_2O$), is essential in producing a desirable catalyst.

The resulting precursor alumina base compositions show in the dried structure by X-ray analysis a characteristic crystalline or quasi crystalline appearance having a high proportion of accessible pore volume in the form of large pores in contrast to the amorphous character and small pore structure of alumina hydrates as usually employed in catalyst preparation. It is preferred that the precursor alumina compositions should be essentially constituted of minute crystallites as evaluated by X-ray diffraction techniques on samples dried at approximately 110° C. Crystallites of about 1000 Angstrom units or less are indicated. Sometimes when observing the dried samples under an electron microscope there appear to be particles of sizes greater than 1000 Angstrom units. Since by X-ray diffraction these sizes are not indicated, these larger particles might be composed of separate crystallites. If the larger sizes constitute only a minor portion of the total sample, then it might be that their presence as single crystallites is not indicated by X-ray diffraction since this technique determines the average crystallite size.

Thus, a reforming catalyst is provided comprising alumina and platinum or other platinum-type metal which is characterized by large pore, high area structure relative to known alumina base reforming catalysts and which is essentially composed of a mixture of gamma-alumina modifications corresponding to a mixture of precursor alumina phases in which crystalline trihydrate predominates. This catalyst is useful in a reforming process for producing gasoline, benzene or other aromatics from light hydrocarbon stocks by contacting the stock under reforming conditions of temperature, pressure and hydrogen partial pressure.

This catalyst may be prepared by a sequence of operations which comprises: forming an alumina hydrogel; converting the alumina hydrogel, which as formed is a highly gelatinous precipitate composed of a mixture of amorphous gelatinous hydrous oxides that normally dry to boehmite or an amorphous appearing alumina hydrate, to a mixture predominating in crystalline trihydrate; incorporating the platinum component in the mixture of hydrate phases; drying the resulting material; and calcining the dried product by treatment at an elevated temperature. Usually, the composition is tableted or extruded into the particular form desired prior to calcination. In preparing the composition relatively pure reagents and special corrosion resistant handling equipment are advantageously used to avoid contaminating sources such as iron.

The inherent disadvantages of platinum-alumina catalysts due to difficulties observed in their regeneration can be overcome in part by the development of catalysts having long active lives. Thus, the catalyst of applications, Serial No. 288,058 and Serial No. 489,726, is an exemplification of this approach. However, due to the overall economic considerations the regeneration of even the longer life platinum-alumina catalyst is desirable. Our present invention is concerned with a process for regenerating a carbonized, non-fluoride-containing, platinum-alumina catalyst of these applications so that processes utilizing this catalyst may be performed on a more economic basis.

We have found that by observing certain reaction procedures and conditions, the regeneration of this platinum-alumina catalyst can be effectively performed. The process of our invention includes a two-stage oxidation operation. In the initial stage, the catalyst is subjected to the oxidative effect of an oxygen-containing gas, which primarily removes or burns the carbon from the catalyst particles. In the second stage, oxidation of the substantially coke-free catalyst is effected under more drastic conditions to oxidize and redisperse the platinum metal probably as stabilized oxides in solid solution in the alumina base. Some oxidation of the platinum metal may take place in our initial stage; the second stage of the process is nevertheless essential to complete transformation of substantially all of the platinum to an oxidized state. Before the regenerated catalyst is employed in a reforming operation it is contacted with hydrogen-containing gases to effect at least partial reduction of the oxidized platinum.

In the initial oxidation stage of our process, the carbonized alumina catalyst is contacted with an oxygen-containing gas to remove by burning substantially all of the deposited coke. Thus the coke is substantially completely removed with the amount of coke remaining on the catalyst after the burning being related to the temperature limitations on subseqent operations, i.e. if too much coke remains excessive temperatures may be obtained when later treating the catalyst with gases richer in oxygen to obtain platinum oxidation and redispersion. In this burning operation, the catalyst is maintained at a temperature from about 500° to about 900° F. Under the preferred reaction conditions, the initial burning of the coke is effected at the lowest possible temperature above 500° F., e.g., 500° to 550° F., and as the burning rate at this temperature decreases the temperature is gradually raised, e.g., up to a maximum of 800° F. to effect a desirable economic burning rate. At temperatures below about 500° F., inferior regeneration is observed due to incomplete removal of coke and possibly also due to less complete oxidation of platinum. At temperatures above about 900° F., deleterious effects may be observed and formation of the desired platinum oxides may be prevented by an unfavorable equilibrium at the oxygen concentrations required to avoid excessive flame temperatures. In burning the carbonaceous material from the catalyst, for instance when, as commercially, the catalyst is disposed in fixed beds, transient temperature peaks of 940 to 950° F. or even higher can be obtained for short periods without apparent damage to the catalyst. Variations in carbon laydown on the catalyst and oxygen distribution in the catalyst bed during burning are factors affecting the burning operation.

After the reforming operation, the catalyst is cooled to the proper temperature for ignition and purged of combustible gases. Thereafter, the desired range of temperatures in the catalyst bed can be maintained by control of the temperature and free oxygen content of the gas at the inlet of the catalyst bed. In this stage, the catalyst can be treated as a fixed, moving or fluidized bed. As an example, the burning reactor can be a single vessel or a serial group of vessels in which the reforming operation is effected and which become available for regenerating the catalyst at the appropriate time by shutting down the reforming process. When operating a serial group of vessels, the catalyst beds can be regenerated in line one by one or simultaneously or in any order through separate lines supplying the oxygen-containing gas to each bed. Alternatively, a group of reforming vessels can be manifolded to be on-stream while one vessel of the group is being regenerated. As far as economically feasible, low oxygen concentrations and short burning periods are preferred.

The oxygen-containing gas supplied to the coke burning zone is composed of oxygen and inert gases which do not support combustion such as nitrogen, carbon dioxide, water vapor and other flue gas constituents. The amount of oxygen in the gas must be sufficient to maintain a flame in the catalyst bed; however, at the same time, this amount must not deleteriously affect the catalyst by giving rise to adverse temperature conditions. Thus, we have found that 1.5 percent of free oxygen by volume is the maximum that should be present in the gas passing to the catalyst bed if the desired result be obtained. The use of gas containing free oxygen in amounts approaching 1.5 percent may give rise to excessive temperatures especially in adiabatic fixed bed operations. In our preferred operation, the free oxygen content is about 0.1 to about 1.0 percent by volume of the total gases entering the bed, but the use of amounts of oxygen near 1.0 percent may produce adverse temperatures in adiabatic fixed bed operations.

The principal constituent of the oxygen-containing gas is nitrogen. In instances in which the oxygen-containing gas is composed of only oxygen and nitrogen, the nitrogen will be present in an amount of 98.5 percent or more by volume depending upon the oxygen concentration. In most instances, however, the oxygen-containing gas will contain ingredients other than oxygen and nitrogen. For instance, carbon dioxide may comprise up to 25 percent by volume of the gas, especially in situations where a portion of the gases passing from the catalyst bed in the coke burning zone are recycled to the bed. The gases other than oxygen and nitrogen introduced into the bed can be substituted for nitrogen on a volume by volume basis.

Another essential condition to be observed in our initial burning stage concerns the water vapors present in the gases flowing through the reactor, which may be introduced as such in the gases fed to the reactor whether they be fresh or recycled and also which is formed as a product of combustion. Water vapor can permanently damage the platinum-alumina catalyst through sintering of the alumina base. This damage increases with increasing partial pressure of water vapor and with the temperature and duration of exposure to water vapor. The maximum partial pressure of water vapor in the reactor varies more or less directly with the oxygen partial pressure of the entering gases. To effect successful regeneration of the catalyst, the partial pressure of water vapor present in the exit gases of the initial burning stage should not exceed 50 mm. of mercury. When the water vapor partial pressure is excessive, it can be lowered by removal from the feed or the fresh or recycled gases according to the desires of the operator and the source of the water vapors. Also, since the partial pressure of the water vapor is a direct function of free oxygen in the entering gases, the amount of water is regulated by controlling the oxygen entry.

The initial burning of the catalyst may be effected at any pressure not exceeding the design limitation of the processing system which is frequently 500 p.s.i.g. However, we prefer to use elevated pressures within the range from about 50 to 150 p.s.i.g., with about 130 p.s.i.g. being particularly desirable.

In the second or platinum reactivation stage of our process, the catalyst is subjected to more drastic oxidation conditions than in the first stage. In the second stage the platinum metal is oxidized to a substantial degree, preferably substantially completely oxidized, and redispersed on the alumina base in order to restore the activity of the catalyst. In addition to being fouled by carbon, it might be considered that a part of the catalyst deactivation process includes the growth of the metallic platinum particles or a decrease in the platinum metal surface area. Hydrogen-deuterium exchange rates of the platinum-alumina catalyst can be taken as a relative measure of the surface area of the platinum. It is found, after reforming for a considerable length of time, that the hydrogen-deuterium exchange rate constant of the catalyst has decreased. This rate constant is measured, after reduction of the catalyst with hydrogen, by passage of a mixture of hydrogen and deuterium over the catalyst at liquid nitrogen temperature and determining the rate at which deuterium hydride is produced. We believe this to be a measure of the platinum surface area for the following reasons: (1) pure alumina has no exchange activity under these conditions; (2) it is necessary to reduce a catalyst to obtain exchange activity; and (3) activation energies of this reaction are constant over a wide range of values of the exchange rate constant, which implies that the rate is entirely a function of platinum surface area. It has furthermore been found that definite correlation exists between the hydrogen-deuterium exchange rate constant and reforming activity.

Catalyst during use in reforming contains platinum metal which is responsible for the hydrogen-deuterium exchange activity and which is insoluble in sulfuric acid. On oxidation varying amounts of "soluble platinum" are formed, dependent upon conditions. The solubility of platinum in sulfuric acid is a measure of the extent to which the platinum is highly dispersed either as zero valent platinum or as that which has been oxidized and stabilized by solid solution in the alumina lattice. Only in this way can we account for the presence of soluble platinum after our second stage oxidation since the bulk metal and oxides are insoluble while alumina is soluble in sulfuric acid.

We have found that the extent of platinum surface area as measured by the hydrogen-deuterium exchange rate constant after reduction by hydrogen is dependent upon the degree of platinum oxidation to the soluble form before reduction, which in turn is dependent upon the catalyst surface area. Thus, catalysts with higher areas require less severe oxidation conditions than do catalysts with lower areas in the second stage of our process.

Since the carbonized platinum-alumina catalyst at the time regeneration becomes necessary will generally have a carbon-free surface area of the order of 150 to 350 square meters per gram, oxidation of the platinum will not usually be complete under the relatively mild regeneration conditions of our process for burning the carbon from the catalyst. If oxidation be not complete, complete redispersion of the platinum metal is not obtained. For this reason, it is necessary to follow our initial carbon-burning operation with the second treatment under conditions which will further, and preferably, substantially completely oxidize the platinum.

In the redispersion stage of our process, certain reaction conditions must be observed if the platinum metal be oxidized and redispersed to a degree sufficient to restore to a substantial extent the activity of the catalyst. The temperature of the catalyst during this oxidation is maintained from about 800° to about 950° with 930° to 950° F. being preferred.

The gases contacting the catalyst in our second oxidation stage should have an oxygen partial pressure of from about 0.2 to about 3 atmospheres with 1 to 3 atmospheres being preferred. The other gases contacting the catalyst as by passing through the catalyst maintained in a dense phase bed are inert as far as combining with the catalyst is concerned and can include nitrogen, carbon dioxide, etc. Preferably, the desired oxygen partial pressure is obtained by compressing dry air to the necessary pressure.

As in the initial burning stage of our process, the water vapor present in the second stage can damage the catalyst as through sintering, and to avoid this result, the gases contacting the catalyst are substantially dry. The water vapor partial pressure is controlled by removing water from the supply of oxygen-containing gas or the recycle gases, according to the convenience of the operator. For instance, we have found that through treatment with a drying agent, a dry gas suitable for our purposes is produced.

The second oxidation stage is conducted for a period of at least 0.5 hour to convert a substantial amount of the platinum to the oxidized or soluble form. The exact length of this treatment will depend upon the particular reaction conditions utilized as well as the degree of activity restoration desired. We prefer to use a second-stage reaction time of from 5 to 30 hours.

While observing the oxidation and redispersion reactions in the second stage of our process, we have noted that there is a tendency toward area loss as the temperature or pressure of this stage increases and these losses will be cumulatively detrimental to the success of succeeding regenerations. Less severe conditions are in general more economical for commercial processing. As in the initial burning stage of our process, the platinum metal oxidation and redispersion stage can be effected while the catalyst is maintained as a fixed bed or fluidized bed in one or more reactor vessels.

In operating our first burning operation, it is advantageous to take exit gases from the reaction vessel flue and recycle them back to the bed in combination with added oxygen. The recycled gases should be dried to remove water of combustion before being reintroduced into the bed in order to keep the water vapor partial pressure of the exit gases below that specified for this operation.

It may in certain instances be desirable to desulfurize the gases passing to the catalyst bed in each of our oxidation reactions; however, this treatment is not essential to the successful regeneration of the catalyst. Desulfurization of gases recycled from the catalyst bed during the coke burning stage may be of particular value.

At the time catalyst regeneration becomes desirable, it is necessary to remove hydrogen and volatile hydrocarbons from the system, and to cool the catalyst to, advantageously, the minimum temperature at which combustion can be initiated, prior to the introduction of the oxygen-containing gas of our initial burning operation. One general procedure for preparing the carbonized catalyst for our initial oxidation treatment can include cooling by reducing the input to the heaters which supply heat to the reforming process, while processing is in progress. Naphtha feed is then discontinued while continuing to recycle the gas through the catalyst; cooling of the catalyst is accomplished by removing heat from the recycle gas prior to its reintroduction to the catalyst bed. When the minimum temperature to initiate combustion is reached, say 500° F., recycle is discontinued, and the pressure is reduced to a partial vacuum to remove the major portion of hydrogen and hydrocarbon. Flue gas or other oxygen-free inert gas is admitted; it is expelled for a period of time to flush out the remaining hydrogen and hydrocarbon, and then admitted until the desired regeneration pressure has been achieved. Circulation of these gases through the catalyst and drier is then started and the oxygen-containing gas is admitted to start combustion of the carbonaceous material deposited on the catalyst.

When regeneration is complete, we remove oxygen-containing gases prior to the admission of hydrogen or hydrocarbon and reduce, at least partially, the oxidized platinum to the metallic state through contact with hydrogen-containing gases prior to the resumption of reforming processing. It is considered desirable to reduce the temperature prior to the reduction step. These objectives may be obtained for instance in the following manner: After completion of the second stage of a catalyst regeneration process the catalyst is cooled to about 800° F. in a manner similar to that described for the start of the regeneration process, the major portion of the oxygen-containing gas is removed by reducing pressure to that of a partial vacuum, the rest being removed by flushing with hydrogen-containing gas after which hydrogen-containing gas is added to a pressure of about 40 p.s.i.g., and circulated to permit reduction of oxidized platinum to platinum metal; naphtha reforming may then be initiated.

The alumina hydrogel of the catalyst which can be regenerated in our process may be formed, for example, by precipitating the gelatinous hydrous oxide from a solution of a soluble aluminum salt such as aluminum chloride. Other soluble sources of aluminum can be employed, for example, aluminum sulfate or sodium aluminate, although subsequent removal of sulfate ion, for example, by washing may occasion more difficulty than chloride ion. Ammonium hydroxide is a useful agent for precipitation of the alumina hydrogel from the salt solution. In the gel-forming step pH control is important in obtaining a good rate of conversion, and it is desirable to maintain a pH between about 7 to about 10. For instance, if the pH is too low, the conversion to trihydrate may be inhibited. As an incident to the gel-forming step, extraneous ions introduced in preparation such as chloride ion are removed by washing with water. For example, it is usually desirable to reduce chloride ion in the hydrogel to a concentration of less than about 0.2 percent.

The conversion of the alumina hydrogel to the desired precursor alumina system may be effected in various ways as by aging the hydrogel which is maintained at a pH of about 7 to about 10 for a period of several days, or as by seeding the hydrogel in the preparation process with crystallites of gibbsite, for example. The transition to the desired phase system predominating in the crystalline trihydrate forms of alumina may be roughly controlled with experience by visual observation. The translucent hydrogel takes on a decidedly whiter and more opaque appearance as the crystallites form and cause light scattering. However, it is desirable to control the transition by sampling, drying the sample to say about 110° C. and determining the distribution of hydrate phases by the technique of X-ray diffraction analysis. Pore volume determinations and surface area measurements as by the BET method are also useful. By this means, the preparation procedure with given materials, operating techniques and equipment may be standardized and then may be controlled as seems necessary with spot analytical checks.

The platinum may be incorporated into the alumina base by adding an aqueous solution of chlorplatinic acid, for example, to the precursor alumina composition followed by precipitation in situ by aqueous hydrogen sulfide solution or by gaseous hydrogen sulfide. Another method of platinum incorporation is to admix a platinum sulfide sol of desired concentration with the precursor alumina composition. The resulting slurry in any case is dried, and preferably, the drying operation is conducted rapidly. For example, the drying should be completed in not more than about 24 hours at about a pH of 6 to 9. Various expedients may be applied to accelerate drying by exercising appropriate precautions. For example, the mixture may be dried using a rotary drum type drier, or it may be pre-filtered to reduce water content and chloride content prior to drying in an oven, or it may be dried using a drum drier after reslurrying, or it may be spray dried. If desired, the platinum may be incorporated into the aged hydrate base after the base has been dried. Alternatively, the aged hydrate base may be impregnated with platinum after drying and partial to complete removal of water of crystallization. However, an advantageous method is that which includes impregnation of the base before drying.

The dried alumina catalyst mixture then may be formed by a tableting or extruding operation. If the catalyst is to be in finely divided form, the grinding operation may follow calcination. In the case of tableting, it is customary to incorporate a die lubricant which advantageously is organic and can be burned out by oxidation in the calcination step. The calcination is effected by burning with an oxygen-containing gas, e.g., by heating the catalyst in the presence of the flowing gas stream at a temperature of about 750° to about 1100° F. for a period of 6 hours. Higher temperatures, e.g., 1200° F., may be employed but the calcination should not be continued to the point of undue catalyst sintering. The calcination can be initiated with a mixture of air and nitrogen and completed with air. When calcining extruded catalyst containing no organic material the use of nitrogen is not necessary. Before use the catalyst can be reduced by subjecting it to contact with flowing hydrogen at a similar temperature and for a period of several hours, e.g., 900° F. and atmospheric pressure for about 1 to about 12 hours. The calcined catalyst contains generally upwards of about 2 percent by weight of matter volatile at 1100° F. and if calcined at 900° F. with dry air and cooled with dry air, such volatile matter constitutes from about 2 to about 5 percent of the weight of the catalyst.

The catalyst compositions of our invention contain about 0.1 to about 1 weight percent of platinum or other platinum metal or combination of platinum metals. The form in which the platinum metal is present is not certain except that it is not detectable by X-ray diffraction methods. Thus, if the platinum metal be present as metal crystallites the fact that they are not detectable by X-ray diffraction methods indicates crystallite sizes of less than about 50 Angstrom units. Excess platinum metal in forms detectable or undetectable by X-ray diffraction techniques may be present but has not been found to provide any advantage justifying the expense.

Also, as noted above, the catalysts are characterized by the existence of the alumina base as a mixture of modifications of gamma alumina which correspond to and derive from a precursor base composition in the uncalcined catalyst of alumina hydrate phases which predominate in the trihydrate form. By this we mean that the percentage of alumina in the form of crystalline trihydrates must exceed 50 percent and preferably approximates about 65 to about 95 percent by weight of the total alumina hydrate composition. The trihydrates present may be gibbsite, bayerite and randomite, the last of which appears to be a trihydrate of crystalline form intermediate the structure of gibbsite and bayerite. We also have observed that it is essential to provide in the precursor phases either by separate addition or by control of the hydrate aging at least about 5 percent and preferably about 10 to about 35 percent by weight of the alumina monohydrate [(AlO)OH] or amorphous hydrous alumina or their mixture.

When an alumina hydrogel is produced for reforming catalyst preparation by precipitation from a solution of an aluminum salt, it is in the form of amorphous hydrated alumina. Upon drying the gelatinous hydrous alumina is converted to the monohydrate, boehmite or a form which appears amorphous under X-ray analysis. Conversion to the trihydrate precursor alumina base composition produces a catalyst having a relatively large portion of its pore volume in the form of large pores when compared to known reforming catalysts. Thus, known high area oxide catalysts are characterized by pores of about 10 to 50 Angstrom units in size. Typical catalysts made from 100 percent boehmite alumina have essentially no pores greater than 50 Angstrom units in size and have pore distributions which are very similar to those of silica-alumina catalysts. On the other hand, the catalysts made from aluminas containing high percentages of the trihydrates in the precursor alumina mixtures having considerable pore volume in the 100 to 1000 Angstrom units pore size range. For example, pore volume distributions determined as a result of nitrogen adsorption-desorption isotherm methods and analysis show that these catalysts have about 0.10 to about 0.5 and preferably about 0.15 to about 0.3 cc./gram of their pore volume, which corresponds to about one-half the total pore volume, in pores greater than about 100 Angstrom units pore size.

The large pores may be formed from the trihydrates because of the fact that the trihydrates in the uncalcined state are indicated by X-ray diffraction as crystalline materials of about 100 to about 1000 Angstrom units crystallite size. These large pores are not formed during calcination but actually exist in the dried, uncalcined alumina. The large pores do not exist in alumina bases derived from the boehmite or monohydrate form of precursor alumina, either before or after calcination. The boehmite type of precursor alumina is characterized by small crystallite size of the order of 40 Angstrom units before and after calcination and contains substantially no pores larger than 50 Angstrom units. It appears, however, that the presence of a minor proportion of the boehmite form or the amorphous hydrous alumina or their mixture in the precursor mixture is advantageous in insuring maximum retention of large-pore volume in addition to the normal fine-pore structure during calcination. Thus, these catalysts characterized by the larger pore volumes contain about 5 to about 35 weight percent of boehmite or amorphous hydrous alumina or their mixture in the precursor mixture.

We have observed a correlation between aging stability, which may be expressed in terms of the rate of activity decline during processing time, and pore volume distribution. We have observed in particular that those catalysts having about 0.2 to about 0.4 cc./gram of their total pore volume in the pore size range of about 100 to about 1000 Angstrom units range show markedly low rates of activity decline under reforming processing conditions, both for production of gasoline and for production of aromatics.

In addition to pore size and pore volume distribution, the nature of the precursor aluminas influences the ultimate structure and state of the catalyst in other ways that appear to be significant with respect to catalyst performance. Where the monohydrate has crystallite sizes of about 30 to 40 Angstrom units and relatively high surface area, e.g., about 300 square meters per gram determined by nitrogen adsorption methods, the crystallite sizes in the uncalcined trihydrate mixture seem to range largely from about 300 to about 1000 Angstrom units by X-ray diffraction techniques and the surface area approximates only about 60 to about 250 square meters per gram. After calcination of the trihydrate, the alumina crystallite sizes predominantly seem to fall in the range of about 35 to about 65 Angstrom units and the surface area ranges from about 350 to about 550 or somewhat more square meters per gram. If the catalyst base be calcined before platinum impregnation, the area may be somewhat less than about 350 square meters per gram. This situation, i.e., the increase of surface area when the alumina trihydrate is calcined, may have an important influence on the ultimate state of dispersion and the crystallite size of the platinum in the catalyst. Considered together the average crystallite size of the trihydrate phases, determined dry before calcination, and the pore size distribution after calcination may be an indication of base structure accessibility related to catalyst activity and stability.

We have also observed by X-ray diffraction studies that the platinum which is effective in these catalysts is not detectable by X-ray diffraction studies and thus does not appear as definite lines. Thus, the effective platinum is in sufficiently finely divided form as to exhibit by X-ray diffraction studies, the substantial absence of crystallites and crystals of size larger than about 50 Angstrom units. A surprising property of the finely dispersed platinum is that it is dissolved to a substantial extent in strong sulfuric acid. This observation suggests that the active platinum may be in some combined form prior to reduction rather than in the form of metallic platinum.

In general, we have found that these catalysts perform under the usual conditions of reforming. The hydrocarbon stock to be reformed is contacted with the catalyst in a reaction zone at an elevated temperature within the range of about 750° F. to about 1000° F. under a total pressure of about 200 to about 1000 p.s.i.g. and a hydrogen circulation approximating from about 3 to about 20 moles of hydrogen per mole of hydrocarbon charge stock. The catalyst is conveniently handled in the form of pellets or tablets which are placed in the reaction zone in the form of a fixed bed, although, in finely divided form, the catalyst may be handled in a fluidized reaction system. The charge stock is preheated to processing temperature in a conventional refinery heater and is combined with the preheated hydrogen gas stream for passage through the reaction zone. Because of the endothermic nature of the reforming reactions, it is usually advantageous to divide the reaction zone into stages and to provide for reheating between stages. The reactor effluent is passed through a liquid-gas separating system from which the fixed gases which usually approximate upwards of about 70 percent hydrogen are recovered for recycle. In one commercial operation the fixed gases contained about 82 percent hydrogen. The liquid products then are fractionated in the usual way for recovery of a stabilized gasoline reformate or for recovery of the selected aromatic hydrocarbons. The optimum processing conditions vary according to the nature of the feed stock, particularly its naphthene content and boiling range. The conditions selected also must account for the nature of the desired products and for the individual selectivity of the particular catalyst.

The following specific examples serve to illustrate our invention, but are not to be considered limiting.

EXAMPLE I

A. *Description of alumina hydrate base*

The base for this catalyst, 400–E–9757, was an alumina hydrate which was 71 days old. The composition of the hydrate (by X-ray diffraction) was: 29% gibbsite, 42% bayerite, 22% randomite, 6% boehmite and traces of amorphous. The crystallite size of the trihydrate phases appeared to be small.

The base was prepared by adding $1NH_4OH:1H_2O$ to a solution of vigorously stirred $AlCl_3 \cdot 6H_2O$ (1# of $AlCl_3 \cdot 6H_2O/2$ liters of deionized water) until the pH equaled 8.0. The hydrate was filtered from the mother liquor and washed to 0.27% Cl (by filter press washing procedure). Reslurries were made using approximately 3 gallons of deionized $H_2O$/lb. of $Al_2O_3$ and the pH of the slurries was adjusted to 8.0 (first reslurry), 9.0, 8.5 and 8.5 (fourth reslurry). The washed hydrate was aged as a filter cake.

B. *Impregnation of alumina hydrate base*

2 liters of alumina hydrate slurry (containing 123 g.

$Al_2O_3/l$.) was placed in a 3 gallon stoneware jar and stirred vigorously for 30 minutes to effect thorough dispersion. With continued stirring, a platinum solution consisting of 34.3 ml. of $H_2PtCl_6$ solution (0.043 g. Pt/ml.) +170 ml. of deionized water was added over a 5 minute period. After 10 minutes' additional stirring, hydrogen sulfide (343 ml. of deionized water saturated with $H_2S$ at 78° F.) was added slowly. The slurry was stirred an additional 30 minutes prior to drying. The resulting slurry was very thin and light brown in color.

C. *Drying, tableting and calcination*

The slurry from above was poured into a Pyrex tray and placed in an Aminco (forced air) oven at 110° C. After a few hours it was noted that the drying was not uniform and a hard rubber-like film had formed on the surface. This film could be redispersed in undried portion of slurry; therefore, to make the slurry (probably 40–50% solids) homogeneous, it was placed in a Waring Blendor for about 30 seconds. The drying was then completed at 110° C.

The dry catalyst was ground to pass 20 mesh, mixed with 2% Sterotex and formed as 5/32" tablets. The Sterotex was burned out at 900° F. using 5 parts of air plus 300 parts of $N_2$ atmosphere; the $O_2$ content was then slowly increased, and finally the catalyst was calcined 6 hours at 900° F. in straight air.

D. *Use in reforming*

As a demonstration of the two-stage regeneration procedure of our invention, a bench scale run, identified as R13–22, was made with a 23.1 gram charge of catalyst and a straight run naphtha feed under the following processing conditions: 500 p.s.i.g., 925° F., 3 weight hourly space velocity, and 10 moles of recycle gas per mole of naphtha feed. The feedstock inspection is shown in the following table:

*Feed stock inspection:*

| | |
|---|---|
| Gravity, °API | 54.3 |
| ASTM distillation, °F.: | |
| IBP | 238 |
| 10% | 255 |
| 50% | 288 |
| 90% | 336 |
| EP | 379 |
| Research octane, neat | 39.6 |

In this case the recycle gas was untreated and the feed was not dried. Processing at these conditions produced a reformate of approximately 90 to 95 research octane neat. Processing in each cycle was continued until the research octane neat of reformate dropped to about 90.

At the conclusion of each processing cycle the reactor was purged with recycle gas and brought to the regeneration temperature of 800° F. After a further purge with nitrogen to remove the combustible gas, air was admitted to the nitrogen stream in such proportion (about 1% of free oxygen by volume, based on nitrogen) as to maintain the entire catalyst bed between 800° F. and 825° F. This was done for about one hour at atmospheric pressure. The maximum partial pressure of the water vapor in the exit gas is estimated at 15 mm. of mercury.

Following this procedure the air flow rate was increased and the nitrogen rate decreased until undiluted dry air was passed through the unit at atmospheric pressure and 800° F. for about one hour. The exit gases at this time were tested and found to be substantially free from carbon dioxide. The total time required for coke burning and passing through the undiluted air was about 2 hours. Throughout the regeneration a total gas flow rate of 20 cu. ft./hr. was maintained.

The reactor was then purged with nitrogen and brought to the reduction temperature of 900° F. Reduction was then carried out by contact with flowing dry and oxygen-free hydrogen at 900° F. and atmospheric pressure for 2 hours, after which the unit was pressured with hydrogen to 500 p.s.i.g. and the temperature was raised to 925° F. to resume processing naphtha.

Inspection of Table I shows the recovery of activity with this method of regeneration. After one regeneration a catalyst with aging resistance superior to the virgin catalyst was obtained. The total production of reformate above 90 octane was more than five times that obtained before regeneration.

TABLE I

| Oil Cycle | Duration, Hours | Initial Octane | Final Octane |
|---|---|---|---|
| 1 (fresh catalyst) | 475 | 97 | 88 |
| 2 | 800 | 96 | 91 |
| 3 | 625 | 95 | 90 |
| 4 | 400 | 94 | 90 |
| 5 | 225 | 93 | 88 |

EXAMPLE II

A batch of catalyst prepared essentially as described above was used at the following reforming conditions: 200 p.s.i.g., 940° F., 44 weight hourly space velocity, and 3 moles of recycle gas per mole of naphtha feed. This run is identified as R–7–42. The feed stock was a Mid-Continent naphtha, similar to that shown in Example I.

The naphtha was dried before being fed to the reactor, and the recycle gas was dried and desulfurized while processing at the above conditions. With virgin catalyst, the above conditions produced a reformate of approximately 80 octane number (research).

The above processing cycle was chosen for rapid deactivation of the catalyst and a single processing cycle consisted of sixteen hours during which time approximately 50 per cent of the original catalyst activity was lost. After the processing cycle the reactor was purged with recycle gas and brought to the regeneration temperature of 800° F. At this temperature wet nitrogen, saturated with water at 80° F., was passed through the reactor for 24 hours in order to simulate the passage of water of combustion over unregenerated catalyst under plant regeneration conditions.

The coke was then burned off at catalyst bed temperatures of 800°–825° F. using a dry gas blend containing 0.35 percent by volume of free oxygen and the balance nitrogen at a total pressure of 400 p.s.i.g. The partial pressure of the water vapor present in the exit gas during burning approximated 30 mm. of mercury. This phase of regeneration was continued for 80 minutes to insure substantially complete removal of coke.

The reactor temperature was then raised to 940° F. and pure dry oxygen was passed through for twenty-four hours at a pressure of 20 p.s.i.g.

The reactor was then purged with nitrogen and brought to the reduction temperature of 900° F. The catalyst was then reduced by contact with flowing dry and oxygen-free hydrogen for two hours after which the temperature was raised to 940° F. and processing resumed.

Table II which follows shows the results obtained in four processing cycles with intervening regeneration by the above procedure. In this and the succeeding example, catalyst activity is defined as 100 times the ratio of the space velocity for aged catalyst to the value independently determined for virgin catalyst to produce the observed octane number of reformate at the pressure, temperature and recycle ratio of the example. It will be noted that the catalyst activity shows very little change from one processing cycle to the next and that the rate of activity decline is nearly the same in all four cycles. These results demonstrate the effectiveness of the present process of mild oxidation to remove coke followed by stronger oxidation to redisperse the platinum metal, and they indicate that further repetition of the above procequired to produce 95 octane reformate increasing from about 950 to 970° F. This information is summarized in Table V.

At the conclusion of this processing cycle the unit was shut down as follows: first the heaters were regulated so as to drop the reactor inlet temperatures below 900° F. Then the naphtha feed was cut out and circulation of recycle gas was continued until the reactor inlet temperatures dropped to 500° F. for Reactor 1, 450° F. for Reactors 2 and 3, where they were maintained in preparation for regeneration. The unit was then depressured and purged with high purity dry nitrogen to eliminate combustible gas from the system.

The unit was then pressured to 30 p.s.i.g. with a blend of 0.7 percent free oxygen by volume in high purity nitrogen. As soon as circulation of this gas blend was begun ignition occurred in the first reactor. Burning was continued while pressuring the system with the same composition of gas blend to 130 p.s.i.g., after which air was fed and gas was recycled from the outlet of the unit to maintain a free oxygen concentration of 0.7 percent by volume in the gas fed to the first reactor. This pressure and free oxygen content at the inlet of Reactor 1 were maintained, with only minor interruptions, for the remainder of the coke-burning operation. The total gas circulation rate for the remainder of the coke-burning operation was 11.5 standard cubic feet per hour per pound of catalyst. All gas fed to the reactors passed through an activated alumina drier which removed substantially all water vapor.

Burning was continued to remove coke in succession from the first, second and third reactors. Completion of burning in each reactor was clearly indicated by the disappearance of the temperature differential between the reactor inlet and outlet. Substantially all burning was done at temperatures above 500° F. although an attempt was made to reduce the temperature of the first reactor after ignition to 450° F. This attempt resulted in apparently unsatisfactory burning and higher temperatures were restored to re-ignite the coke. The maximum temperatures attained during regeneration were as follows: 900° F. in Reactor 1; 900° F. in Reactor 2; and 930° F. in Reactor 3. The maximum partial pressure of water in the exit gas was about 15 mm. of mercury. Total burning time was about 36 hours.

As burning was completed in each reactor the inlet temperature was slowly raised to 940° F. After the removal of coke was substantially complete in all reactors, the system was purged with air, and air recycle through the alumina drier was maintained for twenty-four hours at 130 p.s.i.g. and 940° F. reactor temperatures. The unit was then purged with high purity nitrogen and processing was resumed in the manner described above for initial operations with fresh catalyst, except that recycle gas stored from the previous reforming operation was used, rather than hydrogen, to pressure the system for reduction and initial processing of naphtha.

The following processing conditions were then established: 500 p.s.i.g., 2 weight hourly space velocity, 7 moles of recycle gas per mole of feed, 950° F. reactor inlet temperatures.

Table V compares the results in the first processing cycle with the results obtained after regeneration.

As shown in Table V the activity of the regenerated catalyst compared very favorably with the results prior to regeneration. The yield-octane relationship of the regenerated catalyst was essentially equivalent to that of the fresh catalyst. The success of the two-stage regeneration treatment is further shown by the very satisfactory aging resistance of the regenerated catalyst. The once regenerated catalyst was put back in service and approximately six barrels of feed per pound of catalyst were converted to 95 octane reformate. This processing includes approximately 4 barrels per pound of processing with the Abqaiq-Kuwait naphtha and two barrels per pound of subsequent processing with the Mid-Continent naphtha similar to that of Example II. After this processing the activity of the catalyst was sufficient to continue production of high octane reformate.

TABLE V

*Results of pilot plant run 53–13G with Abqaiq-Kuwait naphtha feed*

|  | C5-EP Research Octane Neat | Average Reactor Inlet Temperature, °F. |
|---|---|---|
| Initial tests with 950° F. reactor inlets, first processing cycle [1] | 95.4 | 950 |
| Final tests with 950° F. reactor inlets, first processing cycle | 89.6 | 950 |
| Final tests before regeneration | 95.3 | 970 |
| Initial tests after regeneration | 95.5 | 950 |
| Tests after regeneration and 400 hours of processing with Abqaiq-Kuwait naphtha feed | 95.3 | 956 |

Each item of data is a calculated average of three consecutive weight-balanced tests.

[1] At this time approximately 5 barrels of feed had been processed per pound of catalyst under mild reforming conditions (82 to 90 octane).

EXAMPLE VI

A sample of catalyst prepared as described in Example I containing 0.55 percent total platinum based on catalyst was processed under reforming conditions and removed. It was found that none of the platinum was in soluble form. Carbon was removed at atmospheric pressure by treatment at 800° F. using commercial nitrogen containing 1.5 percent by volume of free oxygen for about twenty hours. The partial pressure of water vapor in the exit gas was less than 5 mm. of mercury. This was followed by a treatment at 800° F. with atmospheric air. This treatment partially oxidized the platinum only to the extent that 0.43 percent of platinum was converted to the soluble form; upon subsequent treatment with hydrogen at 900° F. the hydrogen-deuterium exchange rate constant was 22. The area was 230 sq. m./g., as determined by nitrogen adsorption and by application of the BET equation.

Portions of this material were oxidized twenty to twenty-four hours under varying conditions of temperature and oxygen partial pressure. The resulting platinum solubilities are given in Table VI:

TABLE VI

| $O_2$ Partial Press. (atm.) | Temp. of Oxidation (° F.) | | | | | | | |
|---|---|---|---|---|---|---|---|---|
|  | 600° | 800° | 900° | 950° | 1,000° | 1,035° | 1,080° | 1,200° |
| 0.015 | 0.08 | 0.27 | | 0.446 | | | 0.367 | |
| 0.21 | | 0.426 | 0.50 | 0.508 | 0.504 | | 0.386 | 0.374 |
| 1.0 | | 0.455 | 0.515 | | 0.53 | | 0.53 | |
| 2.3 | | | 0.53 | | | 0.532 | 0.537 | |
| 3.0 | | | 0.53 | | | | 0.538 | |
| 4.5 | | | | | 0.531 | | | |
| 14 | | | 0.521 | | | | | |
| 35 | | | 0.534 | | | | 0.535 | |

All conditions which lead to an increase in the amount of soluble platinum at the same time increased the hydrogen-deuterium exchange rate constant upon subsequent reduction. For example, formation of 0.50 to 0.54 percent soluble platinum gave exchange rate constants in dure would lead to reasonably long catalyst life even at these adverse processing conditions.

TABLE II

| Oil Cycle | Initial Activity, Percent Relative to Fresh Catalyst | Final Activity, Percent Relative to Fresh Catalyst |
|---|---|---|
| 1 (fresh catalyst) | 100 | 44 |
| 2 | 94 | 42 |
| 3 | 93 | 41 |
| 4 | 98 | 28 |

EXAMPLE III

For comparison with the treatment of Example II where pure oxygen was used for the second oxidation stage, a second run was made differing only in the composition of the oxidizing gas. Thus, in this run air was used at a pressure of 150 p.s.i.g. for the final oxidation instead of pure oxygen at a pressure of 20 p.s.i.g. This run is identified as R-7-44. The results shown in Table III are substantially as good as in Example II.

TABLE III

| Oil Cycle | Initial Activity, Percent Relative to Fresh Catalyst | Final Activity, Percent Relative to Fresh Catalyst |
|---|---|---|
| 1 (fresh catalyst) | 100 | 48 |
| 2 | 75 | 40 |
| 3 | 75 | 39 |
| 4 | 74 | 34 |
| 5 | 80 | 38 |

EXAMPLE IV

As a further demonstration of the two stage regeneration procedure of our invention, a bench scale run, identified as R-9-59, was made with a feed stock similar to that used in Example I but with the processing conditions modified as follows: 200 p.s.i.g., 925° F., 3 weight hourly space velocity, and 10 moles of recycle gas per mole of naphtha feed. The catalyst charge was 23.6 grams.

In this case the recycle gas was dried and desulfurized but the feed was not dried. Processing at these conditions produced a reformate of approximately 100 research octane neat. The processing was carried out in 50 hour cycles with intervening regeneration, except for the first cycle which was continued for 300 hours.

At the conclusion of each processing cycle the reactor was purged with recycle gas and brought to the regeneration temperature of 800° F. After a further purge with nitrogen to remove the combustible gas, air was admitted to the nitrogen stream in such proportion (about 1% of free oxygen by volume, based on nitrogen) as to maintain the entire catalyst bed between 800° F. and 825° F. The air/N₂ ratio was then slowly increased, holding the catalyst bed temperature below 825° F., until undiluted air was being passed through the unit. This procedure required approximately two hours. The air flow was then continued at atmospheric pressure and at 800° F. until evolution of carbon dioxide ceased, this latter step requiring approximately one hour. The total gas flow rates were maintained at 20 cubic feet per hour, as in Example I. The maximum partial pressure of the water vapor in the exit gases is estimated at 15 mm. of mercury.

The reactor was then purged with nitrogen and brought to the reduction temperature of 900° F. Reduction was carried out by contact with flowing dry and oxygen-free hydrogen at 900° F. and atmospheric pressure for two hours, after which the unit was pressured with hydrogen to 200 p.s.i.g. and the temperature was raised to 925° F. to resume processing of naphtha. Inspection of Table IV shows the excellent recovery of activity obtained with this method of regeneration. Twenty-eight cycles of processing and intervening regeneration were carried out with very little change in the initial activity immediately following regeneration or in the rate of activity decline during succeeding cycles. It is clear that the regeneration method here disclosed permits a period of catalyst service far in excess of that possible without regeneration.

TABLE IV

| Oil Cycles | Initial Research Octane of Reformate, Average of Cycles Shown | Research Octane of Reformate After 50 Hours Processing, Average of Cycles Shown |
|---|---|---|
| 1-5 | 99.3 | 97.5 |
| 6-9 | 98.9 | 96.7 |
| 11-15 | 98.6 | 97.0 |
| 16-20 | 99.2 | 96.8 |
| 21-25 | 99.4 | 97.2 |
| 26-28 | 99.2 | 97.5 |

EXAMPLE V

As a further demonstration of the two-stage regeneration procedure of our invention, a pilot plant run was made, with catalyst prepared essentially as described in Example I, but with the reforming conditions modified as follows: 500 p.s.i.g., 2 W.H.S.V., 7 moles of recycle gas per mole of naphtha feed, and reactor inlet temperatures from 910–970° F. according to the reformate quality desired.

The feed stock was a mixture of Abqaiq and Kuwait straight run naphthas, approximate inspections of which are as follows:

Gravity, °API _____ 56.0
ASTM distillation, ° F.:
  IBP _____ 224
  10% _____ 252
  50% _____ 287
  90% _____ 342
  EP _____ 369
Research octane, neat _____ 35.0

This example of regenerative operation differs from the previous ones in two principal respects. First, the design of the reactors was such as to give substantially adiabatic operation, with consequent greater difficulty of heat removal from the catalyst beds. Second, the unit was operated with a much lower gas circulation rate relative to the weight of coke to be burned, and the coke burning period was correspondingly longer. In both of these respects the pilot plant regeneration is considered more typical of the expected commercial applications of this process.

The catalyst was charged in approximately equal portions to the three pilot plant reactors. The system was then purged of air and pressured with hydrogen to about 40 p.s.i.g. Recycle gas flow was established, the reactor inlet temperatures were gradually brought to 800° F., and processing of naphtha was initiated at this condition. The reaction system was pressured up to 500 p.s.i.g. using the gas produced in the naphtha processing.

Processing was continued at 500 p.s.i.g., 2 weight hourly space velocity, 7 moles of recycle gas per mole of naphtha feed, and 910–970° F. reactor inlet temperatures. Approximately eleven barrels of feed per pound of catalyst were processed over a period of approximately 1400 hours, producing reformates varying from 82 to 96 research octane neat. In the latter part of the operation approximately 6 barrels of feed were processed per pound of catalyst with reactor inlet temperatures constant at 950° F. During this period the catalyst was severely deactivated as shown by the research octane of reformate dropping from approximately 95 to 89 with constant reactor inlet temperatures, and the inlet temperature rethe range of 36 to 63, i.e., substantial improvement over that of the virgin catalyst.

At any one temperature, the degree of platinum oxidation increases with oxygen pressure, approaching a limit asymptotically. For the material of Table VI, this limit at 800° F. is substantially below the total amount of platinum present; if the surface area was higher than 230 sq. m./g. this limit would also be higher. However, it is evident that a minimum temperature of oxidation must be employed. Although pressures and temperatures higher than 900° F. and two atmospheres of oxygen in Table V convert all platinum to the soluble form substantially completely, there is no advantage in increasing severity beyond that point. In fact there are certain disadvantages to increasing the severity of oxidation conditions beyond that necessary for complete oxidation of platinum. For example, portions treated at 1035 to 1080° F. and pressures from 2 to 35 atmospheres of oxygen were found to undergo substantial losses of surface area, which is detrimental to the success of subsequent catalyst reactivations.

EXAMPLE VII

A fluoride-free platinum-alumina catalyst produced in a commercial plant which manufactures the catalyst of applications Serial Nos. 288,058 and 489,726, containing approximately 0.6 weight percent platinum has been employed in a 16,000 barrel per day reforming unit which has in series three fixed bed adiabatic reactors with a heater disposed in the feed line to each reactor. Facilities for regenerating the catalyst according to our method are an integral part of this reforming unit.

In commercial production the reforming unit feed rate over a four-month period averaged 11,400 barrels per day. Initially operations were adjusted for the production from straight run naphtha, approximated 215–350° F. ASTM, of a $C_5$–EP reformate having a research octane number (clear) of 85; however, subsequently the octane of the product was raised to 87–88. After four months of operation, difficulties not associated with the performance of the catalyst made it advisable that the unit be shut down for inspection and at this time the catalyst had processed fifteen barrels of feed per pound of catalyst. During the operation the feed inlet temperatures were raised principally to provide the jump to the higher octane product and only a slight increase of temperature was necessitated by reduction in catalyst activity. Upon shut-down of the unit the catalyst was estimated to contain about 6.0 weight percent carbon. It was decided to remove carbon from the catalyst and to note any performance or physical changes in the catalyst which might be caused by following our regeneration procedure.

After the naphtha feed to the unit was stopped and the heater fires cut out, circulation of the predominantly hydrogen-containing recycle gases continued until the reactor bed had cooled to approximately 500° F. The recycle gas compressors were then taken out of service and the unit was depressured and evacuated for hydrocarbon gas and hydrogen removal. With the inert gas generator in operation the system was thoroughly purged. Subsequently the system was evacuated and the unit pressured to approximately 25 p.s.i.g. with inert gas. Circulation of the gas was then started with the recycle gas compressors. The heaters were fired to maintain approximately a 500° F. inlet reactor temperature to each reactor and the unit was then ready for regeneration.

The first stage of our process, i.e., the carbon burn-off, was conducted in two separate operations. First, a low temperature light burn was effected which was followed by the main burn at higher temperature. The burning wave moved progressively through the three beds with the second and third beds undergoing temperature rises before the completion of the burning in the respective preceding bed. This was primarily the result of the passage of the heat wave; however, it was also influenced by the break-through of oxygen from a preceding bed caused by non-linear burning wave characteristics.

At the beginning of the first burn the reactor beds were at 500° F. and approximately 30 p.s.i.g. Dry combustion air at the rate of 100 s.c.f.m. (standard cubic feet per minute) was combined with inert recycle gases and passed to the inlet of the heater for the first reactor. The inert gases were recycled initially at a rate between about 5500 and 6000 s.c.f.m., and were passed over a fixed bed drier before being combined with the combustion air. Based upon gas flow rates the free oxygen content of the total gas stream (combustion air plus inert recycle gases) was initially about 0.35 mole percent. This low temperature burn continued for about eleven hours and was stopped when analysis indicated that the exit gases from the third reactor contained about 0.15 percent free oxygen. At the end of the first hour the mole percent of free oxygen in the total gas stream charged to the first reactor heater was calculated from gas flow rates as about 0.5 mole percent and by the second hour the mole percent of free oxygen was about 0.25. From the second to the eleventh hour the oxygen was calculated as between about 0.25 and 0.20 mole percent.

During the light burn period the combustion air rate varied from 100 to 250° s.c.f.m. while the inert gas recycle rate rose gradually to between 26,000 and 27,000 s.c.f.m. The system pressure increased during this period to about 100 p.s.i.g.

The catalyst bed temperatures during burning were followed by thermocouples placed vertically apart at one foot intervals in the separate beds. The bed temperatures varied in different quadrants of the reactor even at the same level, and the temperatures are reported on the basis of measurements from two quadrants of the bed cross-section. In the initial part of the catalyst bed of the first reactor the temperature peaked at about 550 to 590° F. after combustion gas had been passed in for about 0.5 hour. Subsequent portions of the bed peaked generally successively thereafter with the middle portion reaching from about 660° F. to about 750° F. and the final portion peaking at about 710° F. to 740° F. After peaking each temperature dropped and the entire bed levelled-off at about 440° F. within about eight hours from the beginning of burning. The initial portion of the bed had levelled off at this temperature at the end of about three hours.

Peak temperatures in the second and third beds followed a pattern generally similar to that of the first bed. The second reactor bed temperatures started rising about the time the latter portion of the first bed reached its peak temperature. The peak temperatures of the second bed varied from about 600 to 750° F. and generally within about five to seven hours from the beginning of the burning period. The third reactor bed temperatures started rising about the time the temperatures peaked in the latter portion of the second bed. In the third bed peak temperatures varied from about 625 to 720° F. about eight to ten hours from the beginning of the burning operation.

After inspection of the first reactor subsequent to cooling, the reactor bed temperatures were brought to approximately 750° F. and the second burn started. In this period, combustion air was initially fed at 150 s.c.f.m. and the rate was raised gradually to 500 s.c.f.m. in four hours. This flow rate of combustion air continued through the fourteenth hour when the amount of free oxygen in the third reactor exit gases rose to about 0.15 mole percent. The system pressure started at about 48 p.s.i.g. and leveled-off at about 100 p.s.i.g. in four hours. The inert gas recycle rate began at 18,000 s.c.f.m., rose to about 45,000 s.c.f.m. in four hours, and then dropped gradually to 34,000 s.c.f.m. at the end of the fourteenth hour. Based on gas flow rates the free oxygen content of the total gas stream to the first reactor heater rose from approximately 0.15 mole percent to about 0.30 mole percent in fourteen hours but increases in temperatures would indicate that on the basis of past experience that the free oxygen content of total gas stream was between 0.5 and 0.7 mole percent.

Catalyst bed temperatures during the second burn followed a pattern generally similar to those of the initial burning operation, except that temperatures during the second burning period were higher. For instance, portions of the first bed peaked from about 800° F. to 950° F. generally from the first through the fifth hour of operation. The second bed peaked generally within the same range but within the seventh to ninth hours, and the third bed peaked at temperatures from about 900 to 950° F. in the ninth to thirteenth hours. It is noted that temperatures above 900° F. were measured at various times and these temperature levels were maintained for periods ranging from a few minutes to about three hours or more. As the regenerated catalyst showed good functional and physical characteristics, it is apparent that temperatures of about 950° F. or more can be maintained for short periods in a commercial regeneration procedure without causing an undue deleterious effect on the catalyst. However, during the first burn-off period and the principal portion of the second burn-off period catalyst temperatures were maintained below about 900° F. The amount of carbon which remained on given portions of catalyst after the second burn apparently varied; for instance, in the initial portions of the first and second beds the lower temperatures near 800° F. would in this operation indicate less complete carbon removal than from portions of catalyst reaching about 900° F. However, the bulk of the carbon is removed during the burning operation.

After the oxygen break-through of the exit gases from the third reactor, the free oxygen level in the gas stream supplied to the first reactor heater was held at 2.0 percent and the heaters were employed to bring the catalyst bed temperatures to 940° F. for the air treating period. After the beds reached 940° F. the combustion air rate was increased to 500 s.c.f.m. and the system pressure was held at 100 p.s.i.g. Five hours later the air rate was increased to 1200 s.c.f.m. and three hours subsequent the free oxygen content of the system gases was about 17.6 mole percent. Then, in 2½ hours the initial portion of the catalyst bed of the first and second reactors momentarily peaked at about 972° F. and heater firing was reduced while the free oxygen level in the system dropped to 10.3 mole percent. In fifteen minutes the bed temperatures dropped to 940° F. In view of subsequent satisfactory performance of the catalyst in a reforming operation, it is apparent that the catalyst is not unduly adversely affected by reaching temperatures of about 972° F. for short periods during the oxygen treating step. Eighteen hours after the 1200 s.c.f.m. air rate was started the heater fires were cut out and the system was cooled and depressured. The reactors were opened for inspection and were emptied of catalyst. Equipment was checked and repaired, and alternations were made to avoid the operating difficulties not associated with the functioning of the catalyst which made shutdown advisable. The catalyst which was charged as 1/16" diameter by approximately 1/8" length extruded particles was in good physical condition and contained about 0.2 weight percent carbon. The reactors were reloaded with regenerated catalyst except that minor proportions which were slightly discolored, that is gray or pink instead of white, were replaced with virgin catalyst. Due to changes in design made on the first reactor, the net catalyst inventory in this reactor was reduced. The unit was closed and brought back on stream after reduction of the catalyst by contact with hydrogen-containing gases.

The reforming operation conditions in the new cycle are comparable to those of the previous cycle except for slight changes in the octane number of product and space velocity, i.e. 1.56 against 1.42. To illustrate the comparison of the first and second cycle reforming operations yield data are presented in Table VII. In the table yields have been adjusted to reflect processing operations at the same 10 pound RVP gasoline research octane number (clear) because of the variations of the octane levels and feed stock quality for the periods involved.

TABLE VII

*Comparison of typical yield data for the first and second operating cycles*

| Yields [1] | | First Cycle | Second Cycle |
|---|---|---|---|
| $H_2$ | wt. percent | 1.0 | 0.9 |
| $C_1$ | do | 1.3 | 1.2 |
| $C_2$ | do | 1.9 | 1.8 |
| $C_3$ | do | 2.4 | 2.2 |
| $iC_4$ | vol. percent | 1.6 | 1.5 |
| $nC_4$ | do | 3.3 | 3.2 |
| $C_4$-EP Gasoline | do | 91.5 | 92.0 |
| 10# RVP Gasoline | do | 101.0 | 101.7 |

[1] Yields adjusted to the same base octane level for comparison purposes.

From a review of the data of Table VII it is evident that the commercial regeneration procedure was accomplished with no apparent deleterious effect to the catalyst. The activity level of the catalyst after the regeneration procedure was performed was substantially the same or slightly better than that observed in the first operating cycle.

Except for X-ray diffraction data, unless otherwise indicated when specifying percentages of components of the catalyst composition and of the alumina hydrate, we refer to weight percent on an ignited basis. Also, surface areas as mentioned above are calculated on an ignited weight basis.

This application is a continuation-in-part of application, Serial No. 395,256, filed November 30, 1953 and now abandoned.

We claim:

1. The method of regenerating a carbonized non-fluoride platinum supported on alumina catalyst which comprises the steps of burning the carbonaceous material on the catalyst by passing a gaseous mixture containing inert gases and free oxygen, the latter in an amount sufficient to maintain combustion but not exceeding 1.5 percent by volume of free oxygen, to a bed of the carbonized catalyst maintained at a temperature within the range from about 500° to about 900° F. while maintaining the water vapor partial pressure of the exit gases below 50 mm. of mercury, continuing the burning of the carbonaceous material until it is substantially completely removed from the catalyst, and thereafter maintaining the catalyst at a temperature of about 800° to about 950° F. in a substantially dry atmosphere having a partial pressure of free oxygen of from 0.2 to 3 atmospheres for a period of at least 0.5 hour to convert the metallic platinum to the oxidized form, said platinum-alumina catalyst essentially comprising calcined alumina and platinum which is characterized by large pore, high area base structure essentially composed of gamma alumina modifications resulting from the drying and calcination of a mixture of precursor hydrous alumina phases containing from about 65 to about 95 percent of trihydrate, the amount of platinum being from about 0.1 percent to about 1 percent by weight, the platinum being present in sufficiently finely divided form as to exhibit, by X-ray diffraction studies, the substantial absence of crystallites and crystals of size greater than 50 Angstrom units, said catalyst after calcining and before use having an area (BET method) of from about 350 to about 550 square meters per gram.

2. The method of regenerating a carbonized non-fluoride platinum supported on alumina catalyst which comprises the steps of burning the carbonaceous material on the catalyst by passing an air-flue gas mixture containing sufficient free oxygen to maintain combustion but not exceeding 1.5 percent by volume of free oxygen to a bed of the carbonized catalyst maintained at a temperature of about 500° to about 900° F. while maintaining the water vapor partial pressure of the exit gases below 50 mm. of mercury, drying said flue gas from the bed and recycling the dry gas to the bed while continuing the burning of the carbonaceous material until it is substantially completely removed from the catalyst, and thereafter maintaining the catalyst at a temperature of about 800° to about 950° F. in a substantially dry atmosphere having a partial pressure of free oxygen of from 0.2 to 3 atmospheres for a period of at least 0.5 hours to convert metallic platinum to the oxidized form, said platinum-alumina catalyst essentially comprising calcined alumina and platinum which is characterized by large pore, high area base structure essentially composed of gamma alumina modifications resulting from the drying and calcination of a mixture of precursor hydrous alumina phases containing from about 65 to about 95 percent of trihydrate, the amount of platinum being from about 0.1 percent to about 1 percent by weight, the platinum being present in sufficiently finely divided form as to exhibit, by X-ray diffraction studies, the substantial absence of crystallites and crystals of size greater than 50 Angstrom units, said catalyst after calcining and before use having an area (BET dry atmospheric contact at about 800° to about 950° F. method) of from about 350 to about 550 square meters per gram.

3. The method of claim 2 in which the substantially is conducted with 1 to 3 atmospheres of free oxygen for a period from 5 to 30 hours to convert metallic platinum to the oxidized form.

References Cited in the file of this patent

UNITED STATES PATENTS

| | | |
|---|---|---|
| 2,461,838 | Neuhart | Feb. 15, 1949 |
| 2,641,582 | Haensel | June 9, 1953 |
| 2,664,404 | Blatz et al. | Dec. 29, 1953 |
| 2,752,288 | Voorhies et al. | June 26, 1956 |
| 2,756,187 | Mattox | July 24, 1956 |
| 2,762,752 | Hemminger | Sept. 11, 1956 |

UNITED STATES PATENT OFFICE
CERTIFICATE OF CORRECTION

Patent No. 2,922,766  January 26, 1960

Marvin F. L. Johnson et al.

It is hereby certified that error appears in the printed specification of the above numbered patent requiring correction and that the said Letters Patent should read as corrected below.

Column 22, line 5, strike out "dry atmospheric contact at about 800° to about 950° F." and insert the same after "substantially" in line 8, same column 22.

Signed and sealed this 4th day of April 1961.

(SEAL)
Attest: ERNEST W. SWIDER
Attesting Officer

ARTHUR W. CROCKER
Acting Commissioner of Patents